(12) United States Patent
Jang et al.

(10) Patent No.: US 12,248,759 B2
(45) Date of Patent: Mar. 11, 2025

(54) METHOD AND SYSTEM FOR AUTOMATIC AUGMENTATION OF SIGN LANGUAGE TRANSLATION IN GLOSS UNITS

(71) Applicant: Korea Electronics Technology Institute, Seongnam-si (KR)

(72) Inventors: Jin Yea Jang, Suwon-si (KR); Han Mu Park, Seongnam-si (KR); Yoon Young Jeong, Seoul (KR); Sa Im Shin, Seoul (KR)

(73) Assignee: Korea Electronics Technology Institute, Seongnam-si (KR)

( * ) Notice: Subject to any disclaimer, the term of this patent is extended or adjusted under 35 U.S.C. 154(b) by 417 days.

(21) Appl. No.: 17/563,299

(22) Filed: Dec. 28, 2021

(65) Prior Publication Data

US 2022/0414350 A1 Dec. 29, 2022

(30) Foreign Application Priority Data

Jun. 29, 2021 (KR) .......................... 10-2021-0085060

(51) Int. Cl.
*G06F 40/58* (2020.01)
*G06F 40/53* (2020.01)
*G06N 20/00* (2019.01)

(52) U.S. Cl.
CPC .............. *G06F 40/58* (2020.01); *G06F 40/53* (2020.01); *G06N 20/00* (2019.01)

(58) Field of Classification Search
CPC ........ G06F 40/58; G06F 40/53; G06F 40/216; G06F 40/30; G06F 40/44; G06F 40/42; G06N 20/00; G06N 5/022; G06N 5/04; G06V 40/28

USPC ............................................................. 704/2
See application file for complete search history.

(56) References Cited

U.S. PATENT DOCUMENTS

| 6,116,907 A * | 9/2000 | Baker .................. G09B 21/009 434/167 |
| 9,495,351 B1 * | 11/2016 | Shawver ................ G06V 40/28 |
| 10,504,023 B1 * | 12/2019 | Bengio ..................... G06N 3/08 |
| 11,320,914 B1 * | 5/2022 | Ni .......................... G06F 18/214 |
| 12,159,211 B2 * | 12/2024 | Bird ........................ G06N 3/048 |
| 2016/0042228 A1 * | 2/2016 | Opalka ..................... G06F 3/01 382/103 |

(Continued)

OTHER PUBLICATIONS

Computational Science—ICCS 2019 (Year: 2019).*

(Continued)

*Primary Examiner* — Fariba Sirjani
(74) *Attorney, Agent, or Firm* — NSIP Law

(57) ABSTRACT

There are provided a method and system for automatic augmentation of gloss-based sign language translation data. A system for automatic augmentation of sign language translation training data according to an embodiment includes: a database configured to store a sequence of sign language glosses and a sequence of spoken-language words in pairs; and an augmentation module configured to augment the pairs stored in the database. Accordingly, gloss-based training data of high quality may be acquired by performing automatic augmentation for gloss-based training data for sign language translation in an efficient method in terms of time and economic aspects, and eventually, accuracy of translation between sign language glosses and sentences may be enhanced.

13 Claims, 4 Drawing Sheets

(56) References Cited

U.S. PATENT DOCUMENTS

| | | | | |
|---|---|---|---|---|
| 2019/0251344 A1* | 8/2019 | Menefee | ............... | G06F 3/017 |
| 2019/0354592 A1* | 11/2019 | Musham | ............... | G10L 13/00 |
| 2020/0125992 A1* | 4/2020 | Agarwal | ............... | G06N 3/084 |
| 2020/0192982 A1* | 6/2020 | Luqman | ............... | G06F 40/30 |
| 2022/0036625 A1* | 2/2022 | Sharma | ............... | G10L 25/27 |
| 2022/0327961 A1* | 10/2022 | Kelly | ............... | G09B 21/04 |
| 2022/0414350 A1* | 12/2022 | Jang | ............... | G06F 40/44 |
| 2022/0415009 A1* | 12/2022 | Park | ............... | G06V 10/84 |
| 2023/0343011 A1* | 10/2023 | Kelly | ............... | G06T 13/205 |
| 2024/0249558 A1* | 7/2024 | Park | ............... | G06V 40/16 |

OTHER PUBLICATIONS

"Data Augmentation for Sign Language Gloss Translation" By: Moryossef (Year: 2021).*

"Conditional BERT Contextual Augmentation" By: Wu et. al. (Year: 2019).*

"Augment to Prevent: Short-Text Data Augmentation in Deep Learning for Hate-Speech Classification" By Rizos et. al. (Year: 2019).*

Wu, Xing, et al. "Conditional BERT Contextual Augmentation." arXiv:1812.06705v1, Dec. 17, 2018, (9 pages in English).

Moryossef, Amit, et al. "Data Augmentation for Sign Language Gloss Translation." arXiv preprint arXiv:2105.07476, May 16, 2021, (7 pages in English).

Korean Office Action issued on Mar. 29, 2023, in counterpart Korean Patent Application No. 10-2021-0085060 (5 pages in English, 6 pages in Korean).

* cited by examiner

METHOD AND SYSTEM FOR AUTOMATIC AUGMENTATION OF SIGN LANGUAGE TRANSLATION IN GLOSS UNITS

CROSS-REFERENCE TO RELATED APPLICATION(S) AND CLAIM OF PRIORITY

This application is based on and claims priority under 35 U.S.C. § 119 to Korean Patent Application No. 10-2021-0085060, filed on Jun. 29, 2021, in the Korean Intellectual Property Office, the disclosure of which is herein incorporated by reference in its entirety.

BACKGROUND

Field

The present disclosure relates generally to artificial intelligence (AI) technology, and more particularly, to a method and a system for automatically augmenting and generating gloss-based sign language translation data.

Description of Related Art

The repaid development of artificial intelligence (AI) technology enables automatic recognition of sign language from a sign language video. Current deep learning-based sign language recognition techniques follow the End-to-End training method which directly generates sign language from a video.

However, this method does now show satisfactory recognition performance. This is because a sign language sentence is expressed by a continuous sequence of glosses, but existing methods recognize a sentence in the lump.

Accordingly, there is a demand for recognition of sign language by a new approach based on a gloss unit, not based on a video. In this case, a method for acquiring plenty of necessary training data is required.

SUMMARY

To address the above-discussed deficiencies of the prior art, it is a primary object of the present disclosure to provide a method and a system for automatic augmentation of a gloss-based sign language translation data, which are efficient in terms of time and economic aspects, as a solution for obtaining gloss-based training data of high quality in order to enhance sign language translation performance.

According to an embodiment of the present disclosure to achieve the above-described object, a system for automatic augmentation of sign language translation training data includes: a database configured to store a sequence of sign language glosses and a sequence of spoken-language words in pairs; and an augmentation module configured to augment the pairs stored in the database.

The augmentation module may include a first augmentation module configured to: find a matching of a gloss and a word that have a same meaning from the sequence of sign language glosses and the sequence of spoken-language words; substitute the found gloss and word with another alternative gloss and another alternative word; and generate a new pair of a sequence of sign language glosses and a sequence of spoken-language words.

The first augmentation module may mask a word to substitute in the sequence of spoken-language words, and may input the masked word to an AI model which is already trained to infer a masked word in a sequence of words, and may determine an alternative word.

The first augmentation module may determine a gloss corresponding to the determined word and may generate the new pair of the sequence of sign language glosses and the sequence of spoken-language words.

The AI model may output a plurality of words which are substituted for the masked word, and corresponding probabilities, and the first augmentation module may determine alternative words, based on the outputted probabilities.

The first augmentation module may determine words the probabilities of which, outputted from the AI model, are greater than or equal to a threshold value, as alternative words.

The augmentation module may include a second augmentation module configured to generate a new pair by reorganizing arrangements of glosses in the sequence of sign language glosses and connecting to the existing sequence of spoken-language words in pair.

The augmentation module may include a third augmentation module configured to generate a new pair by generating a new sequence of spoken-language words by transforming the existing sequence of spoken-language words into a sentence of another expression, and connecting the existing sequence of sign language glosses and the new sequence of spoken-language words in pair.

The third augmentation module may transform into the sentence of another expression, by translating the sentence of the sequence of spoken-language words into another language and then back-translating into original language.

According to another embodiment of the present disclosure, a method for automatic augmentation of sign language translation training data may include the steps of: storing a sequence of sign language glosses and a sequence of spoken-language words in pairs; and augmenting the pairs stored in the database.

According to still another embodiment, a system for training an AI model for sign language translation may include: a database configured to store a sequence of sign language glosses and a sequence of spoken-language words in pairs; an augmentation module configured to augment the pairs stored in the database; and a training module configured to train an AI model which receives an input of a sequence of sign language glosses and translates into a sequence of spoken-language words, by using pairs pre-stored in the database and pairs augmented by the augmentation module and stored in the database.

According to yet another embodiment, a method for training an AI model for sign language translation may include the steps of: storing a sequence of sign language glosses and a sequence of spoken-language words in pairs; augmenting the stored pairs; and training an AI model which receives an input of a sequence of sign language glosses and translates into a sequence of spoken-language words, by using pairs stored at the step of storing and pairs augmented at the step of augmenting.

According to embodiments of the present disclosure as described above, gloss-based training data of high quality may be acquired by performing automatic augmentation for gloss-based training data for sign language translation in an efficient method in terms of time and economic aspects, and eventually, accuracy of translation between sign language glosses and sentences may be enhanced.

In addition, according to embodiments of the preset disclosure, quality of augmented data may be guaranteed in association with review by an expert.

Other aspects, advantages, and salient features of the invention will become apparent to those skilled in the art from the following detailed description, which, taken in conjunction with the annexed drawings, discloses exemplary embodiments of the invention.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Hereinafter, the present disclosure will be described in more detail with reference to the accompanying drawings.

Embodiments of the present disclosure suggest a method and a system for automatically augmenting and generating gloss-based sign language translation data.

In embodiments of the present disclosure, as training data for training an AI model for auto translation of sign language, a pair of a sequence of sign language glosses and a sequence of spoken-language words may be augmented.

Embodiments of the present disclosure provide a method for automatic augmentation of gloss-based translation data, which is different from related-art video-based augmentation, and provides a human-in-the-loop system associated with review by sign language experts in order to guarantee quality of augmented training data.

Figure 1:
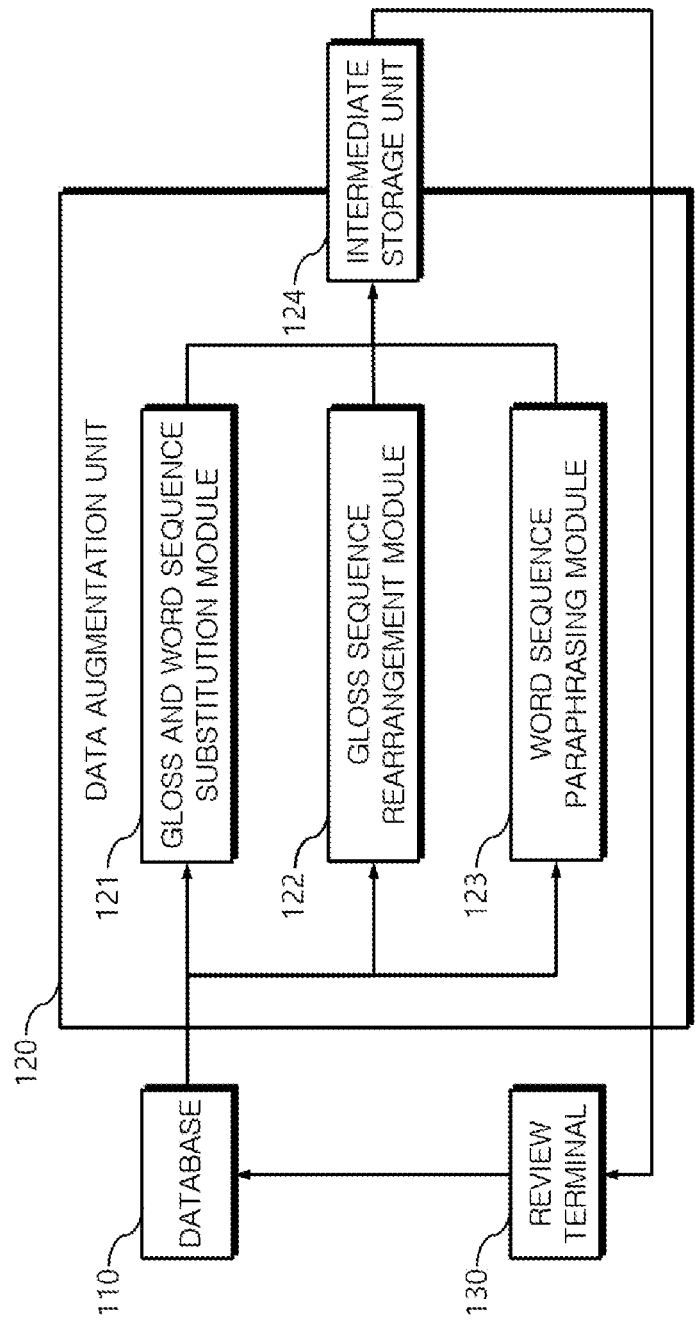
FIG. 1 is a view illustrating a system for automatic augmentation of sign language translation training data according to an embodiment of the present disclosure.

FIG. 1 is a view illustrating a system for automatic augmentation of sign language translation training data according to an embodiment of the present disclosure. The system for automatic augmentation of sign language training data according to an embodiment includes a database 110, a data augmentation unit 120, and a review terminal 130 as shown in the drawing.

The database 110 stores pairs of sequences of sign language glosses and sequences of spoken-language words, which are pre-established as sign language translation training data.

The data augmentation unit 120 is a means for augmenting sign language translation training data stored in the database 110, and may include three modules 121, 122, 123 for automatically augmenting one pair in three methods.

A gloss and word sequence substitution module 121 augments training data by finding a matching of a gloss and a word that have the same meaning from the sequences of sign language glosses and the sequences of spoken-language words stored in the database 110, substituting the found gloss and word with another alternative gloss and another alternative word, and generating a new pair of a sequence of sign language glosses and a sequence of spoken-language words.

In order to find an alternative word, the gloss and word sequence substitution module 121 may mask a word to substitute in the sequence of spoken-language words, and may input the masked word to an 'AI model which is already trained to infer a masked word in a sequence of words', and may determine an alternative word.

The corresponding AI model outputs candidates of words which may be substituted for the masked word, that is, may be put in place of the masked word, and substitution probabilities thereof. The gloss and word sequence substitution module 121 determines words the substitution probability of which is greater than or equal to a threshold value as alternative words.

In addition, the gloss and word sequence substitution module 121 augments the training data by determining a gloss corresponding to the determined word, and generating a new pair of a sequence of sign language glosses and a sequence of spoken-language words by substituting the existing gloss and word in the sequence of sign language glosses and the sequence of spoken-language words, with the determined gloss and word, respectively.

A gloss sequence rearrangement module 122 generates new training data by reorganizing arrangements (order) of glosses in the sequence of sign language glosses.

Specifically, the gloss sequence rearrangement module 122 augments the training data by rearranging positions of glosses in the sequence of sign language glosses, and connecting to the existing sequence of spoken-language words as a new pair.

A word sequence paraphrasing module 123 generates new training data by transforming the sequence of spoken-language words. The sequence of spoken-language words may be regarded as a sentence, and the word sequence paraphrasing module 123 generates a sentence of another expression that maintains the meaning of the existing sequence.

Specifically, the word sequence paraphrasing module 123 generates a sentence of another expression by translating the sentence of the sequence of spoken-language words into another language, and then, back-translating into the original language by using an automatic translation system.

The word sequence paraphrasing module 123 generates new training data by connecting the transformed new sequence of spoken-language words to the existing sequence of sign language glosses as a new pair.

The training data generated by the augmentation modules 121, 122, 123 is temporarily stored in an intermediate storage unit 124.

The review terminal 130 is a terminal that displays the augmented training data, stored in the augmentation modules 121, 122, 123, on a monitor in order for a sign language expert to review the training data. Only the training data that is passed through the review terminal 130 is added to the database 110 as training data.

Figure 2:
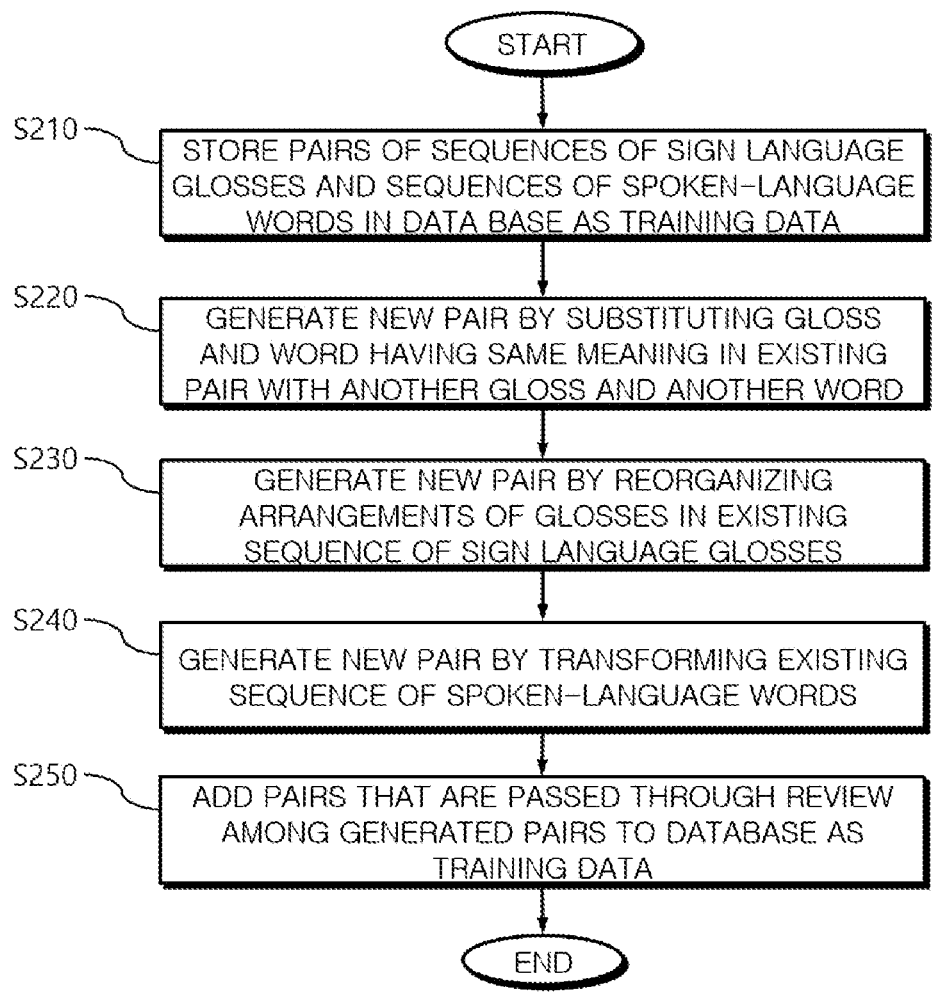
FIG. 2 is a flowchart provided to explain a method for automatic augmentation of sign language translation training data according to another embodiment of the present disclosure.

FIG. 2 is a flowchart provided to explain a method for automatic augmentation of sign language translation training data according to another embodiment of the present disclosure.

As shown in the drawing, pairs of sequences of sign language glosses and sequences of spoken-language words are stored in the database 110 as sign language translation training data (S210).

Then, the gloss and word sequence substitution module 121 generates a new pair by substituting a gloss and a word that have the same meaning in the sequence of sign language glosses and the sequence of spoken-language words stored at step S210, with another gloss and another word (S220).

In addition, the gloss sequence rearrangement module 122 generates a new pair by reorganizing arrangements of glosses in the sequence of sign language glosses (S230).

In addition, the word sequence paraphrasing module 123 generates a new pair by paraphrasing (transforming) the sequence of spoken-language words (S240).

Next, the pairs that are passed by review by the review terminal 130 from among the pairs generated at steps S220 to S240 are added to the database 110 as training data (250).

Figure 3:
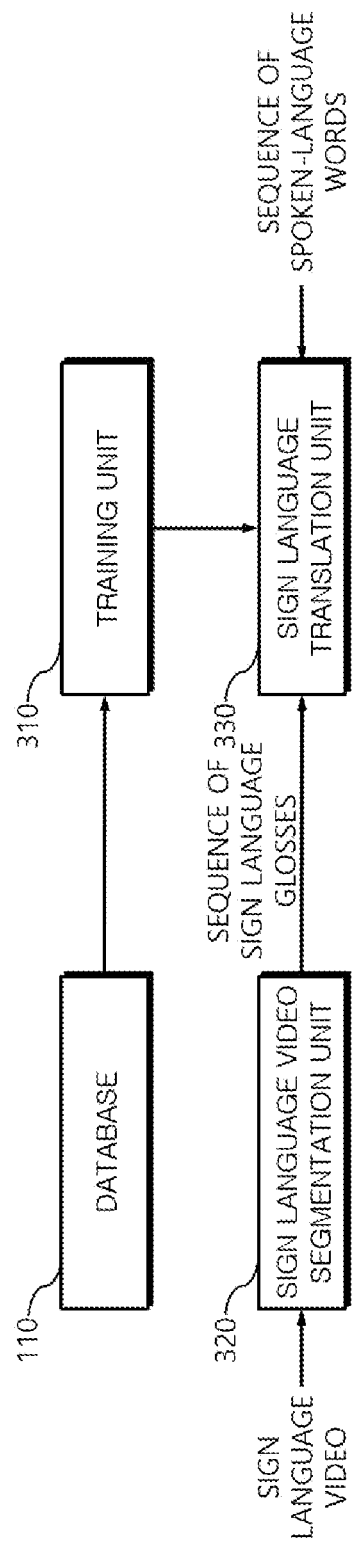
FIG. 3 is a view illustrating a system for gloss-based sign language translation according to still another embodiment of the present disclosure.

FIG. 3 is a view illustrating a gloss-based sign language translation system according to still another embodiment of the present disclosure. The sign language translation system according to an embodiment includes a database 110, a training unit 310, a sign language video segmentation unit 320, and a sign language translation unit 330.

The database 110 stores pairs of sequences of sign language glosses and sequences of spoken-language words as training data. The training data of the database 110 may be established by being stored/augmented in the method illustrated in FIG. 2.

The training unit 310 may train an AI model for performing sign language translation executed at the sign language translation unit 330 by using the training data stored in the database 110. The sign language translation AI model receives an input of a sequence of sign language glosses and infers and outputs a sequence of spoken-language words.

Accordingly, the training unit 310 inputs a sequence of sign language glosses in the pairs stored in the database 110 to the sign language translation AI model, and trains the sign language translation AI model so as to reduce a loss between a result of inferring and the sequence of spoken-language words in the pairs stored in the database 110.

The sign language video segmentation unit 320 segments an inputted sign language video on a gloss basis, and generates a sequence of sign language glosses regarding the inputted sign language video.

The sign language translation unit 330 infers and outputs a sequence of spoken-language words from the sequence of sign language glosses generated by the sign language video segmentation unit 320.

Figure 4:
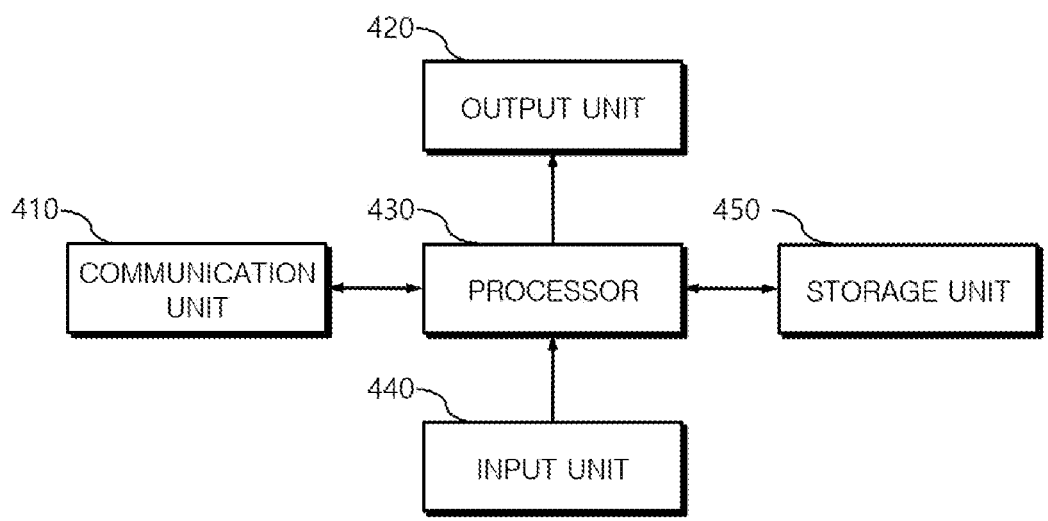
FIG. 4 is a view illustrating a hardware structure for implementing systems according to an embodiment of the present disclosure.

FIG. 4 is a view illustrating a hardware structure which is able to implement the system for automatic augmentation of sign language translation training data, and the gloss-based sign language translation system.

The system according to an embodiment may be implemented by a computing system which is established by including a communication unit 410, an output unit 420, a processor 430, an input unit 430, and a storage unit 450.

The communication unit 410 is a means for communicating with an external device and for accessing an external network. The output unit 420 is a display that displays a result of executing by the processor 430, and the input unit 430 is a user input means for transmitting a user command to the processor 430.

The processor 430 is configured to perform functions of the data augmentation unit 120 of the system for automatic augmentation of translation training data shown in FIG. 1, and the training unit 310, the sign language video segmentation unit 320, and the sign language translation unit 330 of the gloss-based sign language translation system shown in FIG. 3, and may include a plurality of graphic processing units (GPUs) and a central processing unit (CPU).

The storage unit 450 provides a storage space necessary for operations and functions of the processor 430, and establishes the database 110 therein.

Up to now, the system for automatic augmentation of sign language translation training data and the gloss-based sign language translation system have been described in detail with reference to preferred embodiments.

Embodiments of the present disclosure provide a method for automatically augmenting pairs of sequences of sign language glosses and sequences of spoken-language words, which are used for training an AI model for automatic translation of sign language, by using AI technology.

Accordingly, gloss-based data of high quality may be acquired through data augmentation technology, which is efficient in terms of time and economic aspects, and performance of sign language translation is enhanced, so that accuracy of translation between sign language glosses and sentences can be enhanced.

The technical concept of the present disclosure may be applied to a computer-readable recording medium which records a computer program for performing the functions of the apparatus and the method according to the present embodiments. In addition, the technical idea according to various embodiments of the present disclosure may be implemented in the form of a computer readable code recorded on the computer-readable recording medium. The computer-readable recording medium may be any data storage device that can be read by a computer and can store data. For example, the computer-readable recording medium may be a read only memory (ROM), a random access memory (RAM), a CD-ROM, a magnetic tape, a floppy disk, an optical disk, a hard disk drive, or the like. A computer readable code or program that is stored in the computer readable recording medium may be transmitted via a network connected between computers.

In addition, while preferred embodiments of the present disclosure have been illustrated and described, the present disclosure is not limited to the above-described specific embodiments. Various changes can be made by a person skilled in the art without departing from the scope of the present disclosure claimed in claims, and also, changed embodiments should not be understood as being separate from the technical idea or prospect of the present disclosure.

What is claimed is:

1. A system for automatic augmentation of sign language translation training data, the system comprising:
   one or more processors configured to:
   store, in a database, a sequence of sign language glosses and a sequence of spoken-language words in pairs; and training an artificial intelligence (AI) based-model, to perform an interference operation including a recognition and a translation of sign languages, using an augmented training data from the database based on a result of augmenting the pairs stored in the database, the augmenting including:
finding a matching of a gloss and a word that have a same meaning from the sequence of sign language glosses and the sequence of spoken-language words;
substituting the found gloss and word with another alternative gloss and another alternative word; and
generating, as the augmented training data, a new pair of a sequence of sign language glosses and a sequence of spoken-language words to augment the pairs stored in the database, including reorganizing arrangements of glosses in the sequence of sign language glosses and connecting to the sequence of spoken-language words in pair,
wherein the generating the new pair further includes masking a word to substitute in the sequence of spoken-language words, and
inputting the masked word to the artificial intelligence (AI) based-model which is already trained to infer a masked word in a sequence of words, and to determine an alternative word.

2. The system of claim 1, wherein the one or more processors are configured to determine a gloss corresponding to the determined word and to generate the new pair of the sequence of sign language glosses and the sequence of spoken-language words.

3. The system of claim 1, wherein the AI-based model is configured to output a plurality of words which are substituted for the masked word, and corresponding probabilities, and
wherein the one or more processors are configured to determine alternative words, based on the outputted probabilities.

4. The system of claim 3, wherein the one or more processors are configured to determine words the probabilities of which, outputted from the AI model, are greater than or equal to a threshold value, as alternative words.

5. The system of claim 1, wherein the one or more processors are configured to generate a new pair by generating a new sequence of spoken-language words by transforming the existing sequence of spoken-language words into a sentence of another expression, and connecting the existing sequence of sign language glosses and the new sequence of spoken-language words in pair.

6. The system of claim 5, wherein the one or more processors are configured to transform into the sentence of another expression, by translating the sentence of the sequence of spoken-language words into another language and then back-translating into original language.

7. A processor-implemented method for automatic augmentation of sign language translation training data, the method comprising:
storing a sequence of sign language glosses and a sequence of spoken-language words in pairs; and
training an artificial intelligence (AI) based-model to perform an inference operation using an augmented training data from the database based on a result of augmenting the pairs stored in the database,
the augmenting further including:
finding a matching of a gloss and a word that have a same meaning from the sequence of sign language glosses and the sequence of spoken-language words;
substituting the found gloss and word with another alternative gloss and another alternative word; and
generating, as the augmented training data, a new pair of a sequence of sign language glosses and a sequence of spoken-language words to augment the pairs stored in the database, including reorganizing arrangements of glosses in the sequence of sign language glosses and connecting to the sequence of spoken-language words in pair,
wherein the generating the new pair further includes masking a word to substitute in the sequence of spoken-language words, and inputting the masked word to the artificial intelligence (AI) based-model which is already trained to infer a masked word in a sequence of words, and to determine an alternative word.

8. The method of claim 7, further comprises determining a gloss corresponding to the determined word and to generate the new pair of the sequence of sign language glosses and the sequence of spoken-language words.

9. The method of claim 7, wherein the AI-based model is configured to output a plurality of words which are substituted for the masked word, and corresponding probabilities, and
wherein the method further includes determining alternative words, based on the outputted probabilities.

10. The method of claim 9, further comprises determining words the probabilities of which, outputted from the AI model, are greater than or equal to a threshold value, as alternative words.

11. The method of claim 7, further comprises generating a new pair by generating a new sequence of spoken-language words by transforming the existing sequence of spoken-language words into a sentence of another expression, and connecting the existing sequence of sign language glosses and the new sequence of spoken-language words in pair.

12. The method of claim 11, further comprises transforming into the sentence of another expression, by translating the sentence of the sequence of spoken-language words into another language and then back-translating into original language.

13. A system for training an AI model for sign language translation, the system comprising:
one or more processors configured to:
store, in a database, a sequence of sign language glosses and a sequence of spoken-language words in pairs;
augment the pairs stored in the database; and
train an artificial intelligence (AI)-based model which receives an input of a sequence of sign language glosses and translates into a sequence of spoken-language words, by using pairs pre-stored in the database and pairs augmented and stored in the database,
wherein the augmenting includes:
finding a matching of a gloss and a word that have a same meaning from the sequence of sign language glosses and the sequence of spoken-language words;
substituting the found gloss and word with another alternative gloss and another alternative word; and
generating a new pair of a sequence of sign language glosses and a sequence of spoken-language words to augment the pairs stored in the database, including reorganizing arrangements of glosses in the sequence of sign language glosses and connecting to the sequence of spoken-language words in pair,
wherein the generating the new pair further includes masking a word to substitute in the sequence of spoken-language words, and inputting the masked word to the AI-based-model which is already trained to infer a masked word in a sequence of words, and to determine an alternative word.

\* \* \* \* \*